United States Patent Office 3,351,274
Patented Nov. 7, 1967

3,351,274
FIGURE DRUM
Rudolf Styner, Frauenkappelen, Switzerland, assignor to Styner & Bienz AG, Niederwangen, Switzerland
Filed Mar. 1, 1966, Ser. No. 530,962
2 Claims. (Cl. 235—1.3)

This invention relates to a figure drum for cash registers, calculating machines and the like. Figure drums for visual indication must have minimum circumferential length, diameter and width so that figures 0–9 or letters of sufficient size may be disposed on the rim portion of such drums. Therefore, prior figure drums made of metal have a high moment of inertia and they cannot directly be driven by adjusting elements such as toothed racks when excessive forces or extremely slow adjustment should be avoided.

The above drawbacks have been avoided in prior indicating systems by providing an elastical coupling between the figure drum and the driving pinion for the same, whereby a spiral spring may be used as an example. However, a high-quality spring is required because its length should not change, any change of the length of the spiral spring resulting in shifting of the relative angular position of the figure drum and its driving pinion.

It is the object of this invention to provide a novel figure drum for indicating systems, allowing a substantial simplification of the indicating mechanism with high adjusting speed at low inertia forces. The figure drum according to this invention broadly comprises a rim portion carrying the figures, spokes and a hub portion adapted to be coupled with driving means for the figure drum are made in one piece of plastic material, said spokes having a cross section providing for high flexibility of the spokes in circumferential direction of the drum, an elastic coupling being thereby obtained between said rim portion and hub portion. The flexible spokes preferably having a flat cross section in axial planes, form an elastical coupling between the hub portion and rim portion of the drum so that separate elastic coupling means between the drum and the driving pinion for the same may be omitted. The rim portion of the drum may be made relatively thin and light so that its moment of inertia is small. The transient oscillating phenomenons at the beginning and end of the adjusting operation of the indicating system are very short and of small amplitude due to the relatively small inertia of the rim portion and the relatively low elasticity of the spokes. The oscillation of the spokes having flat cross section in axial planes is further efficiently lamped by the relatively high air resistance opposing displacement in circumferential direction. Preferably the driving pinion may be made in one piece with the figure drum.

Although figure drums made of plastic material are known they have never been made with spokes having a form and cross section increasing their flexibility in circumferential direction.

Figure 1:
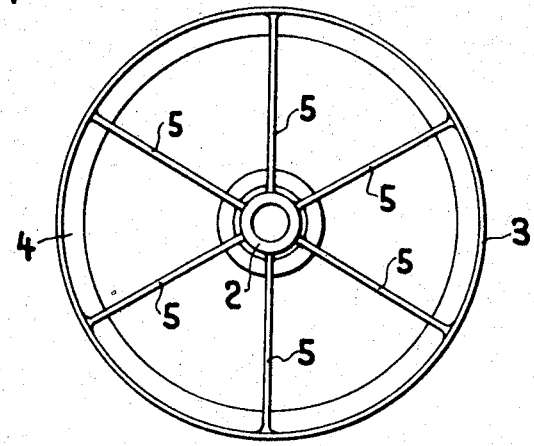
Figure 2:
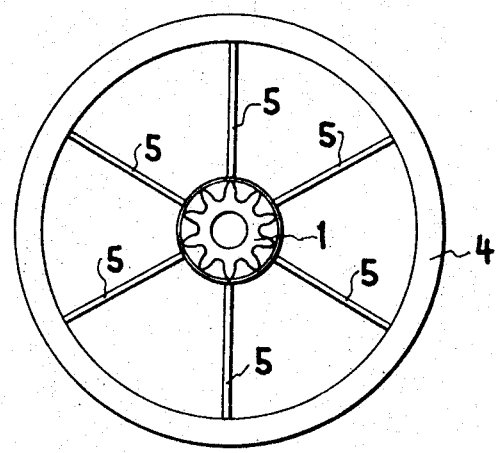
Figure 3:
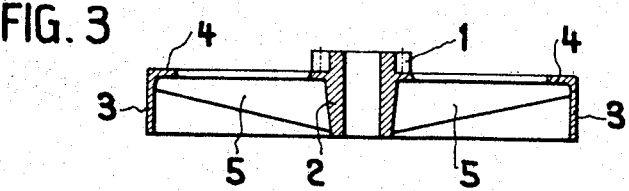

The attached drawing shows, by way of example, one embodiment of the invention.
FIG. 1 is an end view;
FIG. 2 is another end view from an opposite side; and
FIG. 3 is a sectional view.
The figure drum is made in one piece of plastic material by die casting. The pinion 1 is formed at the one end of the hub portion 2 of which the bore serves for rotatably mounting the drum on a shaft not shown in the drawing. Due to the fact that the bearing surfaces are made of plastic material, no lubrication is required. The figures are disposed on the outer surface of the cylindrical portion 3 of the rim of the drum. The rim portion is reinforced by means of a radial flange 4. The hub portion 2 and the rim portion 3 are interconnected by spokes 5 having a flat cross section in axial planes. The axial width and consequently the cross section decreases towards the outer end of the spokes, and since the bending moment acting in the spokes during acceleration or deceleration of the drum also decreases towards the outer end of the spokes, the cross sections are adapted to the bending stresses on the full radial length of the spokes.

Of course modifications of the figure drum are possible within the scope of this invention as defined by the claims. As an example, a steel pinion may be fixed to the drum or may be moulded into the hub portion of the drum.

A figure drum made of polyamide and having the following dimensions was found to be suitable in practical use:

|  | Mm. |
|---|---|
| Diameter of rim portion | 82 |
| Width without pinion | 12 |
| Thickness of rim portion | .65 |
| Thickness of flange portion | .80 |
| Thickness of spokes | .80 |
| Width of spokes, inner end | 10 |
| Width of spokes, outer end | 2 |
| Diameter of hub portion | 11 |
| Diameter of hub bore | 7 |

What I claim is:
1. A figure drum for cash registers, calculating machines and the like, comprising:
   a rim portion having figures thereon;
   a hub portion;
   spokes of flat cross section between said hub portion and said rim portion;
   the spoke cross section including longer sides and small side edges;
   the longer sides of the cross section of the spokes extending in an axial direction, and the small side edges of the cross section extending in a circumferential direction, whereby substantial flexibility of the spokes in circumferential direction is obtained;
   said hub portion, rim portion and spokes being made in one single piece of plastic material; and
   an elastic coupling formed between the hub portion and rim portion by the flexibility in circumferential direction of said spokes.
2. A figure drum as defined in claim 1, and:
   an annular radial flange extending inwardly from one edge of the rim portion;
   one edge of each spoke extending radially inwardly from said flange portion and the opposite edge of each spoke extending inwardly from said rim portion at an angle relative to the radial direction; and
   the height of each spoke adjacent said hub portion exceeding the height of the spoke adjacent said rim portion and flange portion respectively.

References Cited

UNITED STATES PATENTS

| 1,359,484 | 11/1920 | Bourne | 235—1.3 |
| 3,016,579 | 1/1962 | Schlitzkus | 235—1.3 |
| 3,148,413 | 9/1964 | Latrubesse | 18—30 |

FOREIGN PATENTS

| 670,985 | 1/1939 | Germany. |

RICHARD B. WILKINSON, *Primary Examiner.*
GEORGE H. MILLER, JR., *Assistant Examiner.*